April 21, 1925.
R. M. WATSON
REAR COMPARTMENT FOR VEHICLES
Filed March 27, 1924    2 Sheets-Sheet 1
1,534,337
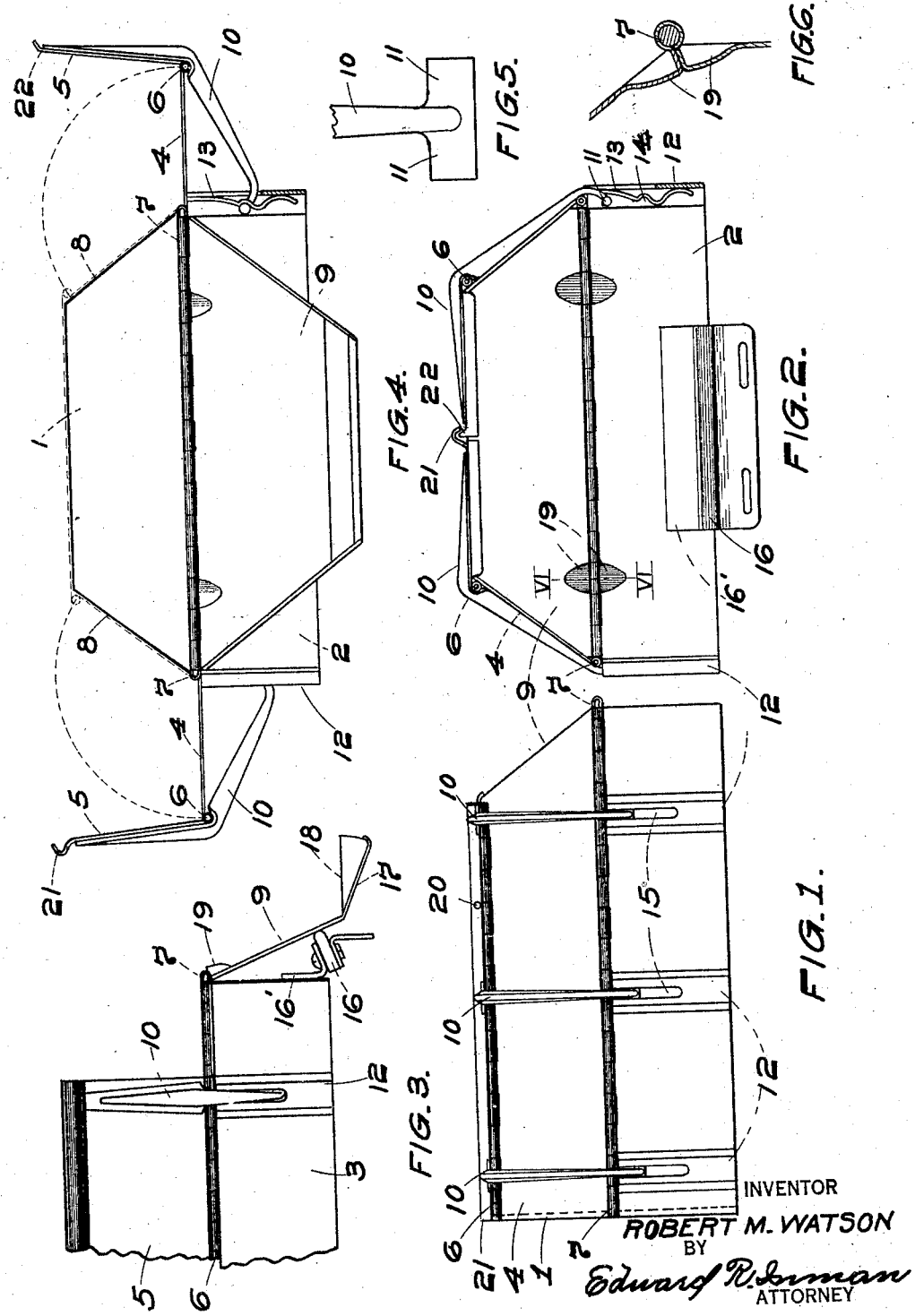

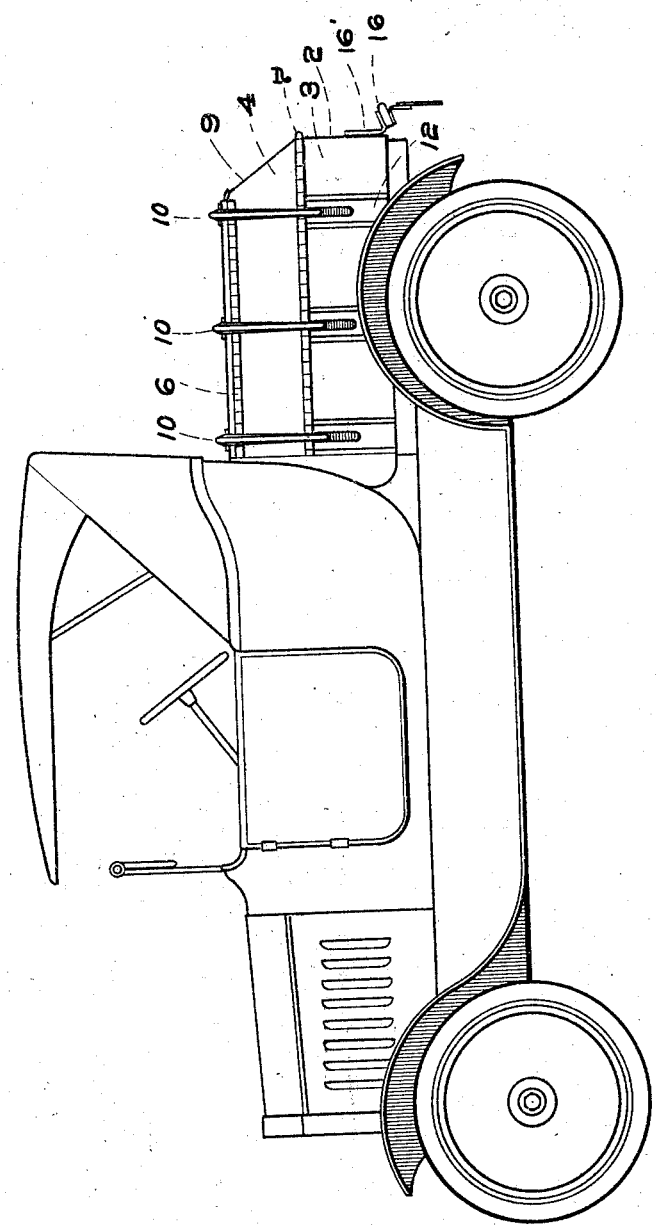

Patented Apr. 21, 1925.

1,534,337

UNITED STATES PATENT OFFICE.

ROBERT M. WATSON, OF SHIPPENSVILLE, PENNSYLVANIA.

REAR COMPARTMENT FOR VEHICLES.

Application filed March 27, 1924. Serial No. 702,228.

*To all whom it may concern:*

Be it known that I, ROBERT M. WATSON, citizen of the United States, residing at Shippensville, in the county of Clarion and State of Pennsylvania, have invented certain new and useful Improvements in Rear Compartments for Vehicles, of which the following is a specification.

The objects, construction and utility of this invention are herein set forth with sufficient clearness to enable others skilled in the art to which it relates, to make and use the same.

This invention relates especially to a compartment or bed for vehicles of various types, and is well adapted as a rear compartment for that type of automobiles termed "runabouts." It may also be adapted for use as a bed for trucks, both large and small, farm wagons and vehicles of general utility, of either the automotive or horse-drawn type, as well as handcarts, usually termed "push-carts."

The construction of my improved rear compartment is clearly illustrated in the accompanying drawings, in which:

Fig. 1 is a side elevation showing my improved rear compartment adapted for use as a rear compartment for a runabout, and in the closed position.

Fig. 2 is a rear elevation of said compartment, also in the closed position.

Fig. 3 is a side elevation of the rear end of said compartment in the open position.

Fig. 4 is a rear elevation of said compartment in the open position.

Fig. 5 is a side view of the lower end of one of the braces used in this construction.

Fig. 6 is a section on line VI—VI of Fig. 2, showing a position-stop for the rear endgate of the compartment.

Fig. 7 is a side elevation of a runabout having my improved rear compartment applied thereto, said compartment being shown in the closed position.

The material employed in my improved rear compartment is preferably sheet metal, and the construction illustrated in the drawings is substantially as follows:

A box or bed is constructed, which consists of a front end 1, a rear end 2 and the side-walls 3, 3. Combined cover and extension devices are provided which comprise two duplex, or double-leaved sections, each consisting of the members 4, 5. Said leaf members 4 and 5 are hinged together, edge-to-edge, by means of the hinges 6, and the leaf members 4 are, in turn, hinged at one of their edges, to the upper edge to the respective sides 3 of the bed, by means of the hinges 7. The front end wall 1 of said bed is a rigid, unitary member and projects above the sides 3; each edge of said member 1 which projects above said sides 3, is formed at an angle or inward slope relative to said sides.

When that portion of the cover structure which is composed of said leaves 4 and 5 is closed, the intermediate leaf 4 rests upon and conforms to said edges 8 of said forward end, and the outer, or free-edged leaf 5 rests upon the top, horizontally-disposed edge of said end 1. The rear end of said body is provided with a downwardly-swinging gate 9 which is hinged at its lower edge to said end 2. The object and utility of said gate 9 will be presently set forth.

Each double-leaved section 4, 5, of said cover is provided with one or more angle-braces 10, 10, the number of which is determined by the length of the bed. The upper end of each of said braces is rigidly secured to the section 5, as, by welding or riveting, but the lower end of said braces is not secured to the sections 4, but is free therefrom, as will be readily seen from an inspection of Fig. 4. The lower end of each of said braces 10, is formed into a T-shaped head 11, as indicated in Figs. 2, 4 and 5.

A vertically-disposed guide-way 12 is rigidly secured to each side 3 of said bed, upon the outer face thereof, for the reception of said heads 11, and in which they may move vertically when the cover is opened or closed.

The arrangement of each cover structure is such that the member 4—5 thereof may be opened to and arranged in the position shown in Figs. 3 and 4 for the purpose of increasing the capacity of the compartment, thus affording more room for merchandise, commodities of various sorts, or for the accommodation of passengers, as may be desired, and, in case said compartment is occupied by passengers, the member 4 of the cover forms a seat, and the member 5 forms the back of the seat. In this case the braces 10 form a firm support for said seat also a brace and support for said back, and are arrangeable to retain said seat and back in the position shown in Fig. 4.

Within each side of said guide-members 12 is placed a leaf spring 13, each of which is formed at 14 into a detent to engage the respective ends of said head 11. Said springs are so arranged that they normally, but yieldably encroach upon the path of movement of said heads 11, and when said covers are opened, and said heads thereby caused to move downward they impinge upon said springs, thus crowding them outwardly until said heads come opposite to the detent-notches 14, whereupon the recoil of said springs causes said notches 14 to yieldably retain said heads therein against accidental displacement, also to prevent any rattling of said heads within their respective guides. The lower end of the guide-slots 15 is so positioned as to form a stop for said braces in their downward movement, and to insure the proper relative positioning of said members 4—5.

When my improved compartment is to be utilized for carrying passengers, the end-gate is swung downwardly to the position shown in Figs. 3 and 4 to form a step, in which position said gate rests upon and is supported by the stop 16, which is preferably a flexible member supported by the bracket 16'.

The flange 17 of said gate, upon which the rearward ends of said cover members 5 rest, when the cover is closed is provided with a tread-surface or pad 18, which is preferably rubber, thus forming a safe and convenient step for getting into and out of the compartment.

For the purpose of causing said end-gate 9 to stop at and be positioned in its proper location, when closed, stop-lugs 19 are employed. These lugs are pressed inwardly in the sheet metal of said gate 9 and the end piece 2, and the contact of their juxtaposed faces forms a stop in the closing movement of the gate, and insures its proper positioning and retainment thereat.

An aperture 20 through the joint-bead 21, and the joint-flange 22 of the cover members 5 is provided for the reception of a lock whereby the cover structure may be locked in the closed position.

This construction may be readily adapted for use as a truck-body by making it of a suitable length for such purpose, and providing a suitable number of braces 10.

I claim the following:

In a rear compartment for vehicles, a rectangular box or bed for such vehicle having vertical side walls in combination with a combined cover and seat structure for each side of said bed, each of said structures comprising a seat-member and a back-member arranged edge-to-edge and hinged together at the juxtaposed edges, one edge of said structure being arranged in juxtaposition and hinged to the upper edge of the side-wall of its respective side of said bed whereby said structures are adapted to fold over and co-operatively form a cover for said bed, also to be extended and arranged in such position that the leaf in juxtaposition to said side-wall shall project horizontally outwardly therefrom to form a passenger-carrying seat and the other member of said structure shall be positioned vertically to form a back for said seat, a plurality of angle-braces for each of said structures each secured through one of its legs to one of said back-forming members, the other leg of each of said braces being free and provided at its lower extremity with a T-head, and a vertically-slotted guide for each of said braces secured to the outer face of said side-walls for the reception and operation of the T-head of its respective brace whereby said combined cover and seat structures are adapted to be arranged and retained in the aforesaid seat and back-forming positions.

In testimony whereof I affix my signature.

ROBERT M. WATSON.